(12) United States Patent
Saugrain et al.

(10) Patent No.: US 12,381,019 B2
(45) Date of Patent: Aug. 5, 2025

(54) MULTIPLE COOLING SYSTEMS ARRANGEMENT FOR SUPERCONDUCTING CABLE SYSTEM

(71) Applicant: NEXANS, Courbevoie (FR)

(72) Inventors: Jean-Maxime Saugrain, Le Vésinet (FR); Nicolas Lallouet, Baincthun (FR)

(73) Assignee: NEXANS, Courbevoie (FR)

( * ) Notice: Subject to any disclaimer, the term of this patent is extended or adjusted under 35 U.S.C. 154(b) by 25 days.

(21) Appl. No.: 18/085,470

(22) Filed: Dec. 20, 2022

(65) Prior Publication Data

US 2023/0230727 A1  Jul. 20, 2023

(30) Foreign Application Priority Data

Jan. 7, 2022 (FR) .................................. 2200110

(51) Int. Cl.
  *H01B 12/00* (2006.01)
  *H01B 12/02* (2006.01)
  *H01B 12/16* (2006.01)

(52) U.S. Cl.
  CPC ............. *H01B 12/16* (2013.01); *H01B 12/02* (2013.01)

(58) Field of Classification Search
  CPC ................................ H01B 12/16; H01B 12/02
  See application file for complete search history.

(56) References Cited

U.S. PATENT DOCUMENTS

| 2006/0283620 | A1* | 12/2006 | Maguire | ............... | H01B 12/16 |
| | | | | | 174/125.1 |
| 2007/0084623 | A1* | 4/2007 | Yamaguchi | ............ | H01B 12/16 |
| | | | | | 174/125.1 |
| 2010/0087322 | A1* | 4/2010 | Yuan | ................. | H02G 15/34 |
| | | | | | 62/77 |
| 2011/0177954 | A1* | 7/2011 | Gamble | ................. | H02J 3/36 |
| | | | | | 361/699 |
| 2012/0186854 | A1 | 7/2012 | Choi et al. | | |
| 2013/0199821 | A1 | 8/2013 | Teng et al. | | |
| 2015/0364232 | A1 | 12/2015 | Yuan et al. | | |

FOREIGN PATENT DOCUMENTS

DE    20 2019 003381    8/2019

OTHER PUBLICATIONS

DE 202019003381; English Translation; Oct. 2, 2019 (Year: 2020).*
DE 202019003381; English Translation; Oct. 2, 2019 (Year: 2019).*
International Search Report dated Aug. 11, 2022.

* cited by examiner

*Primary Examiner* — Pete T Lee
(74) *Attorney, Agent, or Firm* — MUNCY, GEISSLER, OLDS & LOWE, P.C.

(57) ABSTRACT

A superconducting wired electrical circuit has two portions (1a, 1b) each having a superconducting cable core (2a, 2b), an electrical insulation layer (3a, 3b), a screen (4a, 4b) and a cryogenic jacket (5a, 5b) surrounding the screen (4a, 4b) to allow the circulation of a cryogenic fluid. At least a first arrangement (A) has a cryostatic junction unit (7) electrically connecting, in series, the two portions (1a, 1b), an inlet/outlet duct (14) for cryogenic fluid. A distinct tap-off module (12) has at least one inlet/outlet tapping (15) for the flow of a cryogenic fluid in the second portion (1b). A device (13) for blocking the passage of cryogenic fluid is interposed between the duct (14) and the tapping (15) and positioned around and in contact with the screen (4b) of the second portion (1b).

16 Claims, 3 Drawing Sheets

MULTIPLE COOLING SYSTEMS ARRANGEMENT FOR SUPERCONDUCTING CABLE SYSTEM

RELATED APPLICATION

This application claims the benefit of priority from French Patent Application No. 22 00110, filed on Jan. 7, 2022, the entirety of which is incorporated by reference.

TECHNICAL FIELD

The present invention relates to the general field of wired superconducting circuits, and more specifically wired superconducting circuits comprising two, or even several, length portions of superconducting cable connected in series.

BACKGROUND

A superconducting cable is able to transport high-intensity electrical current with a cable cross section that is far smaller than that of a conventional cable made up of a resistive electrical conductor, while at the same time limiting the electrical losses along the cable, notably the Joule heating effect losses because this phenomenon disappears in the superconducting state.

A superconducting cable is conventionally made up of at least one superconducting cable core surrounded by an electrical insulation layer, itself surrounded by a screen, all enclosed inside a cryogenic jacket. The cryogenic jacket comprises for example two concentric jackets thermally insulated from one another by a vacuum. A cryogenic fluid, such as helium or nitrogen, in liquid or gaseous form, contained inside the cryogenic jacket, cools the central superconducting wire down to a temperature below what is known as the critical temperature at which this wire enters a superconducting state.

It is known practice to use wired circuits made up of either a single superconducting cable of great length, or a plurality of superconducting cables connected to one another in series, so as to transport a high-intensity current over a long distance. With this type of circuit, if the cryogenic fluid is injected under pressure and at a temperature below the critical temperature at an injection point situated at one end of the circuit, there is no guarantee, on the one hand, that the pressure will remain high enough to allow the cryogenic fluid to circulate along the entire length of the circuit or, on the other hand, that the cryogenic fluid will not warm up to a temperature above the critical temperature as it moves along the circuit away from the fluid injection point.

The simplest technical solution is to increase the cross section for the flow of cryogenic fluid along the entire length of the cable, to considerably increase the initial pressure and to reduce the minimum temperature of the cryogenic fluid at the time at which it is injected into the system. However, this has an enormous impact on the specifications and therefore the costs associated with the cooling system. In addition, there is a technical limit if the circuit is very long: even with a cooling system that uses the highest technically achievable pressure, with the cryogen being input at the temperature that is as low as possible before it freezes, and with the highest possible cross section for the cryogenic jacket containing the cryogen, the maximum possible length for a given design of cable will be limited by physics.

Another solution is to split the wired superconducting circuit into several subcircuits: after a given length of cable that is reasonable for the cooling system, the cable is stopped with a termination and a further subcircuit begins with a new termination and a new cooling system. This solution likewise entails a considerable increase in the costs over lengths extending to several kilometres, because it requires a sort of intermediate substation for each "stopping" of the superconducting cable (additional civil engineering works, several additional terminations for each "stopping" of the cable, short resistive connection between each subsystem, etc.).

OBJECTS AND SUMMARY OF THE INVENTION

It is an objective of the present invention to propose solutions for wired superconducting circuits that are particularly well suited to better management of the cryogenic fluids, even if these circuits are of considerable length.

More specifically, one subject of the present invention is a superconducting wired electric circuit, comprising: #
- a first length portion of superconducting cable and a second length portion of superconducting cable, each of the first and second length portions of superconducting cable comprising a superconducting cable core, an electrical insulation layer surrounding the superconducting cable core, a shielding screen surrounding the electrical insulation layer and a cryogenic jacket surrounding the screen to allow a cryogenic fluid to circulate in an annular space delimited by the screen and the cryogenic jacket; and
- at least a first arrangement comprising a cryostatic junction unit electrically connecting, in series, the first portion and the second portion, an inlet/outlet duct for cryogenic fluid, and a device for blocking the passage of cryogenic fluid positioned around and in contact with the shielding screen of the second length portion of superconducting cable,
- characterized in that said at least one first arrangement further comprises a tap-off module distinct from said cryostatic junction unit and interposed between the cryostatic junction unit and the second length portion of superconducting cable, said tap-off module comprising at least one inlet/outlet tapping for the flow of a cryogenic fluid in the second length portion of superconducting cable; and in that the device for blocking the passage of cryogenic fluid is a stainless steel or glass-fibre reinforced plastic disc interposed between said inlet/outlet duct and said inlet/outlet tapping.

In one possible embodiment, said cryostatic junction unit comprises:
- two access openings through each of which an end of the first, and respectively of the second, length portion of superconducting cable may extend, each opening being configured to allow the fluid-tight fixing of an end of the cryogenic jacket of the corresponding length portion of superconducting cable, and
- a connector electrically connecting the ends of the two superconducting cable cores.

In one possible embodiment, the blocking device of said arrangement is positioned inside the cryostatic junction unit, facing the access opening through which the second length portion of cable passes and against this access opening so as to block it off, said cryostatic junction unit further bearing said cryogenic fluid inlet/outlet duct.

In a variant, the tap-off module bears said inlet/outlet duct of said arrangement, and the blocking device is positioned inside the tap-off module, between said inlet/outlet duct and said inlet/outlet tapping.

The circuit may comprise at least one cooling system connected to the inlet/outlet duct and/or to the inlet/outlet tapping so as to receive a cryogenic fluid circulating inside one of the portions of cable.

In one possible embodiment, the end of the first, and respectively of the second, length portion of superconducting cable, opposite to the end extending into the cryostatic junction unit of the first arrangement is connected to a first, and respectively to a second, termination electrically connected to an electrical network, said at least one cooling system being connected to the first termination via a first cryogenic transfer line and to said first arrangement via the inlet/outlet duct so as to form a closed loop for the circulation of a first cryogenic fluid, said at least one cooling system being configured to cool and pressurize the first cryogenic fluid circulating in the first length portion of superconducting cable and received via the inlet/outlet duct and to reinject it into the first length portion of superconducting cable via the first cryogenic transfer line.

The circuit may then further comprise an additional cooling system connected to the second termination via a second cryogenic transfer line and to said first arrangement via the inlet/outlet tapping to form a closed loop for the circulation of a second cryogenic fluid, said additional cooling system being configured to cool and pressurize the second cryogenic fluid circulating in the second length portion of superconducting cable and received via the inlet/outlet tapping and to reinject it into the second length portion of superconducting cable via the second cryogenic transfer line.

In another possible embodiment, the cooling system is connected directly to the inlet/outlet duct and to the inlet/outlet tapping of said first arrangement, said cooling system being configured to cool and pressurize the cryogenic fluid circulating in the first length portion of superconducting cable and received via the inlet/outlet duct and to reinject it into the second length portion of superconducting cable via the inlet/outlet tapping.

The end of the first, and respectively of the second, length portion of superconducting cable, opposite to the end extending into the cryostatic junction unit of said first arrangement may also be connected to a first, and respectively to a second, termination electrically connected to an electrical network.

The circuit may then comprise an additional cooling system connected to the first termination via a first cryogenic transfer line and to the second termination via a second cryogenic transfer line to form a closed loop for the circulation of the cryogenic fluid, said additional cooling system being configured to cool and pressurize the cryogenic fluid circulating in the second length portion of superconducting cable and received via the second cryogenic transfer line and to reinject it into the first length portion of superconducting cable via the first cryogenic transfer line.

In another possible embodiment, the circuit comprises:
a third length portion of superconducting cable comprising a superconducting cable core, an electrical insulation layer surrounding the superconducting cable core, a screen surrounding the electrical insulation layer and a cryogenic jacket surrounding the screen to allow the circulation of a cryogenic fluid in an annular space delimited by the screen and the cryogenic jacket; and
a second arrangement comprising a cryostatic junction unit electrically connecting, in series, the third portion and the end of the first portion opposite to the end extending into the cryostatic junction unit of the first arrangement, an inlet/outlet duct for cryogenic fluid, a tap-off module comprising at least one inlet/outlet tapping for the flow of at least a cryogenic fluid in the first length portion of superconducting cable, and a device for blocking the passage of cryogenic fluid and interposed between said inlet/outlet duct of the second arrangement and said inlet/outlet tapping of the second arrangement, the blocking device being positioned around and in contact with the screen of the first length portion of superconducting cable,
wherein the cooling system is connected directly to the inlet/outlet duct of the first arrangement and to the inlet/outlet tapping of the second arrangement to form a closed loop for the circulation of a first cryogenic fluid, said cooling system being configured to cool and pressurize the first cryogenic fluid circulating in the first length portion of superconducting cable and received via the inlet/outlet duct of the first arrangement and to reinject it into the first length portion of superconducting cable via the inlet/outlet tapping of the second arrangement.

The circuit may then comprise:
a fourth length portion of superconducting cable comprising a superconducting cable core, an electrical insulation layer surrounding the superconducting cable core, a screen surrounding the electrical insulation layer and a cryogenic jacket surrounding the screen to allow the circulation of a cryogenic fluid in an annular space delimited by the screen and the cryogenic jacket;
a third arrangement comprising a cryostatic junction unit electrically connecting, in series, the fourth portion and the end of the second portion opposite to the end extending into the cryostatic junction unit of the first arrangement, an inlet/outlet duct for cryogenic fluid, a tap-off module comprising at least one inlet/outlet tapping for the flow of at least a cryogenic fluid in the fourth length portion of superconducting cable, and a device for blocking the passage of cryogenic fluid and interposed between said inlet/outlet duct of the third arrangement and said inlet/outlet tapping of the third arrangement, the blocking device being positioned around and in contact with the screen of the fourth length portion of superconducting cable, and
an additional cooling system connected directly to the inlet/outlet duct of the third arrangement and to the inlet/outlet tapping of the first arrangement to form a closed loop for the circulation of a second cryogenic fluid, said additional cooling system being configured to cool and pressurize the second cryogenic fluid circulating in the second length portion of superconducting cable and received via the inlet/outlet duct of the third arrangement and to reinject it into the second length portion of superconducting cable via the inlet/outlet tapping of the first arrangement.

In another possible embodiment of the electric circuit, the end of the first, and respectively of the second, length portion of superconducting cable, opposite to the end extending into the cryostatic junction unit of the first arrangement is connected to a first, and respectively to a second, termination electrically connected to a phase of an electrical network.

A three-phase system may comprise three of these wired superconducting electric circuits each defining one phase of the system.

In one possible embodiment of such a three-phase system, the first arrangement of a first phase of the three phases of the system comprises an additional inlet/outlet duct and an additional inlet/outlet tapping and is connected to the first arrangements of each of the other two phases such that:

its inlet/outlet duct and its inlet/outlet tapping are respectively connected to the inlet/outlet duct and to the tapping of the first arrangement associated with a second phase of the three phases;

its additional inlet/outlet duct and its additional inlet/outlet tapping are respectively connected to the inlet/outlet duct and to the inlet/outlet tapping of the first arrangement associated with a third phase of the three phases.

Such a three-phase system may further comprise:

a first cooling system injecting a first main flow of cryogenic fluid into the first length portion of cable of the first phase through the corresponding termination;

a second cooling system injecting a second main flow of cryogenic fluid into the second length portion of cable of the first phase through the corresponding termination, wherein the first, and respectively the second, main flow is divided by the first arrangement of the first phase into two half-flows and then recombined by the first, and respectively by the second, cooling system to be reinjected once again, after the pressure and temperature have been readjusted, into the first, and respectively into the second, length portion of cable of the first phase.

BRIEF DESCRIPTION OF THE FIGURES

The description that is to follow with reference to the attached drawings given by way of nonlimiting examples will make it easy to understand what the invention consists of and how it may be realized. In the attached figures.

DETAILED DESCRIPTION OF EMBODIMENT(S)

In the figures, elements that are identical or equivalent will bear the same reference signs. The various diagrams are not drawn to scale.

Figure 1:
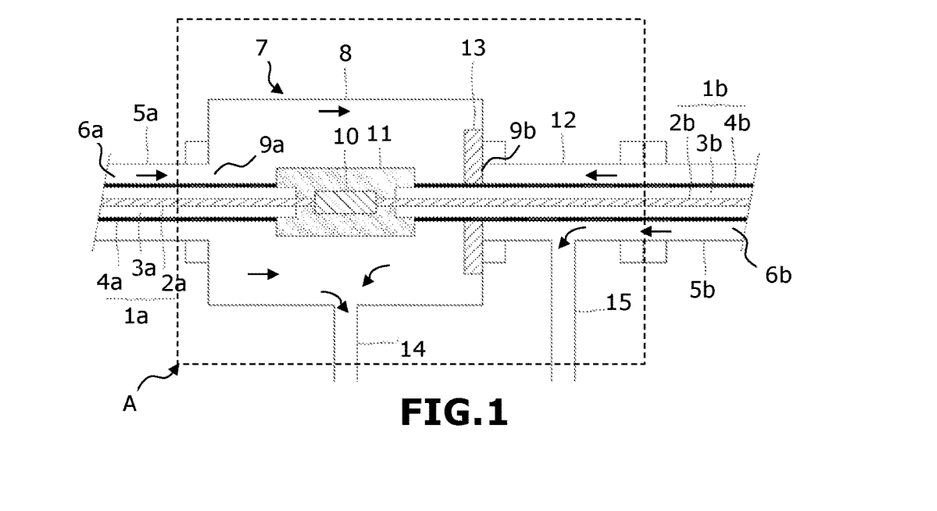
FIG. 1 schematically and partially illustrates an example of a wired superconducting electric circuit according to a first embodiment according to the invention.

FIG. 1 schematically and partially illustrates a wired superconducting electric circuit comprising two length portions of superconducting cable which are connected in series according to a first embodiment according to the invention.

More specifically, the circuit comprises, in the nonlimiting example schematically indicated in FIG. 1, a first length portion 1a of superconducting cable and a second length portion 1b of superconducting cable. In what follows, the letter "a" will be added to the numerical references relating to the cable length portion 1a, and the letter "b" will be added to the numerical references relating to the cable length portion 1b. Each length portion 1a, 1b of superconducting cable comprises, starting from the innermost element of the cable to the outermost element:

a superconducting cable core 2a, 2b, an electrical insulation layer 3a, 3b surrounding the superconducting cable core 2a, 2b, a screen 4a, 4b surrounding the electrical insulation layer 3a, 3b and providing electromagnetic shielding, and a cryogenic jacket 5a, 5b surrounding the screen 4a, 4b to allow a cryogenic fluid to circulate in an annular space 6a, 6b delimited by the screen 4a, 4b and the internal surface of the cryogenic jacket 5a, 5b.

The core 2a, 2b comprises for example a longitudinal metal element (for example one or more copper strands) surrounded by at least a superconducting layer (formed for example of several superconducting strips or wires).

The electrical insulation layer 3a, 3b is made up for example of several layers of insulating tape of the PLP (polypropylene laminated paper) type.

The screen 4a, 4b is made for example of copper strip and the strip may also be associated with superconducting strip.

The cryogenic jacket 5a, 5b preferably comprises two concentric jackets (not depicted) preferably made of corrugated stainless steel, thermally insulated from one another by a vacuum. As indicated previously, the space 6a, 6b delimited by the screen 4a, 4b and the internal surface of the cryogenic jacket 5a, 5b is an annular space of the length portion 1a, 1b of superconducting cable, inside which space a cryogenic fluid can flow. The cryogenic fluid, such as helium or nitrogen, in liquid or gaseous form, circulating inside the cryogenic jacket 5a, 5b, has to cool the core 2a, 2b down to a temperature below the so-called critical temperature at which this core enters a superconducting state.

The two length portions 1a, 1b of superconducting cable may come from the one same cable, or different cables. Moreover, the cryogenic fluids circulating in the two portions 1a, 1b may be the same fluids or different fluids.

In any event, the two length portions 1a, 1b of superconducting cable are connected in series by an arrangement A comprising a cryostatic junction unit 7 that accepts one end of each of the two portions 1a, 1b. The external jacket 8 of the cryostatic junction unit 7 is a cryogenic jacket preferably, like with the length portions 1a, 1b of superconducting cable, made up of an internal jacket and of an external jacket (which are not depicted) which are thermally insulated from one another by a vacuum.

In order to allow the series connection of the two length portions 1a, 1b of superconducting cable, the cryostatic unit 7 comprises two access openings 9a, 9b providing access to the cryostatic unit 7, these openings being situated for example facing one another, and through which the ends of the length portions 1a, 1b of cable may extend. Each access opening 9a, 9b is configured to allow fluid-tight securing of one end of the cryogenic jacket 5a, 5b of the length portion 1a, 1b of cable attached to it. As may be seen in FIG. 1, the cryogenic jacket 5a, 5b has been removed over the end length portion of the portion 1a, 1b which penetrates inside the unit 7. The cryostatic junction unit 7 also encloses a connector 10 allowing the series electrical connection of the two ends of the superconducting cable cores 2a, 2b. As may be seen in FIG. 1, end portions of the screen 4a, 4b and of the electrical insulation layer 3a, 3b have been removed to allow only the ends of the cores 2a, 2b to be electrically connected by the connector 10.

The connector 10 is preferably surrounded by a device 11 able to withstand the electrical field between the connector 10 (which is at a voltage) and the screens 4a and 4b (which are at earth potential). This device 11 makes it possible to ensure the continuity of the electrical insulation and the electrical continuity of the screens between the portion 1a and 1b. Such a device is described for example in document EP2105994A1.

The arrangement A schematically indicated in FIG. 1 also comprises:
- an inlet/outlet duct 14 for the cryogenic fluid,
- a tap-off module 12 comprising at least one inlet/outlet tapping 15 for the flow of a cryogenic fluid in the second length portion 1b of superconducting cable; and
- a device 13 for blocking the passage of cryogenic fluid, interposed between the inlet/outlet duct 14 and the inlet/outlet tapping 15, and positioned around and in contact with the screen 4b of the second length portion 1b of superconducting cable.

The tap-off module 12 has, passing through it without discontinuity, the end of the second portion 1b of cable comprising the core 2b, the insulation layer 3b and the screen 4b so that these elements can enter the unit 7. The tap-off module 12 also comprises a cryogenic jacket to ensure the continuity of the flow of cryogenic fluid.

The blocking device 13 is, for example, a stainless steel or glass-fibre reinforced plastic disc. In one possible embodiment, sealing between this blocking device 13 and the screen 4b is enhanced by the injection of an epoxy resin.

In the embodiment of FIG. 1, the blocking device 13 is positioned inside the cryostatic junction unit 7 of the arrangement A, preferably facing the access opening 9b through which the second portion 1b passes, and against this access opening 9b so as to close off this opening. It thus prevents, on the one hand, the cryogenic fluid contained in the unit 7 from entering the cryogenic jacket of the tap-off module 12 and, on the other hand, the cryogenic fluid contained in the second portion 1b of cable from entering the unit 7.

The cryostatic junction unit 7 also bears the fluid inlet/outlet duct 14 of the arrangement A. In the nonlimiting example of FIG. 1 and as indicated by the arrows, the duct 14 is used as an outlet by the cryogenic fluid circulating in the first portion 1a of cable and then in the unit 7, and the tapping 15 is used as an outlet by the cryogenic fluid circulating in the second portion 1b of cable and then in the tap-off module 12.

Figure 2:
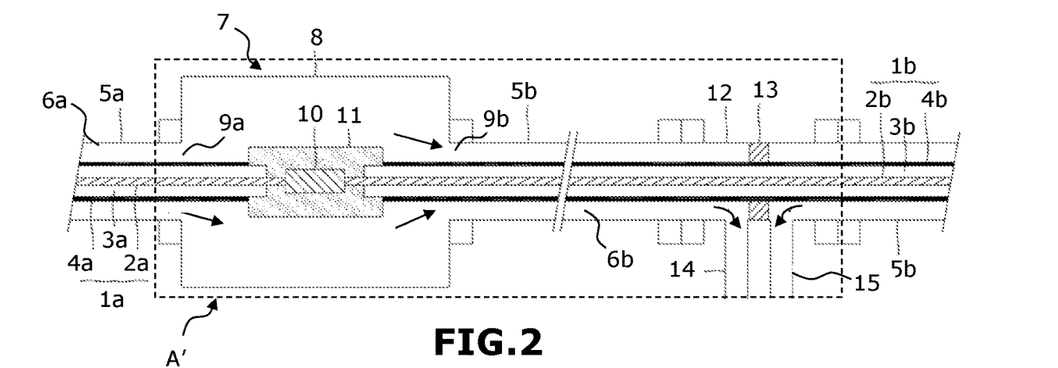
FIG. 2 schematically and partially illustrates an example of a wired superconducting electric circuit according to a second embodiment according to the invention.

FIG. 2 schematically and partially illustrates a wired superconducting electric circuit according to a second embodiment according to the invention. This second embodiment differs from the first embodiment of FIG. 1 only in respect of the following:
- the cryostatic junction unit 7 no longer comprises the inlet/outlet duct 14 of FIG. 1, which has been transferred over to the tap-off module 12; and
- the blocking device 13 is positioned inside the tap-off module 12 of the cryostatic junction unit 7, between the inlet/outlet duct 14 and the inlet/outlet tapping 15. Just as in the first embodiment, this blocking device 13 is positioned around and in contact with the screen 4b of the second length portion 1b of cable.

In the nonlimiting example of FIG. 2 and as indicated by the arrows, the inlet/outlet duct 14 is used as an outlet by the cryogenic fluid circulating in the first portion 1a of cable and then in the cryostatic junction unit 7 and then in the tap-off module 12, and the tapping 15 is used as an outlet by the cryogenic fluid circulating in the second portion 1b of cable and then in the tap-off module 12. In what follows, the combination of the cryostatic junction unit 7 with its connector 10 for the series connection of the two length portions 1a, 1b of superconducting cable and of the tap-off module 12, equipped with the blocking device 13 positioned between the duct 14 and the tapping 15 will be referred to as "arrangement A". It will be noted here that the distance between the unit 7 and the tap-off module 12 may be great or small.

In any event, the invention as has just been described in the preceding two embodiments allows, as will now be detailed, various configurations to be applied, all of them allowing effective management of the temperature and pressure of the flows of cryogenic fluids.

Figure 3:
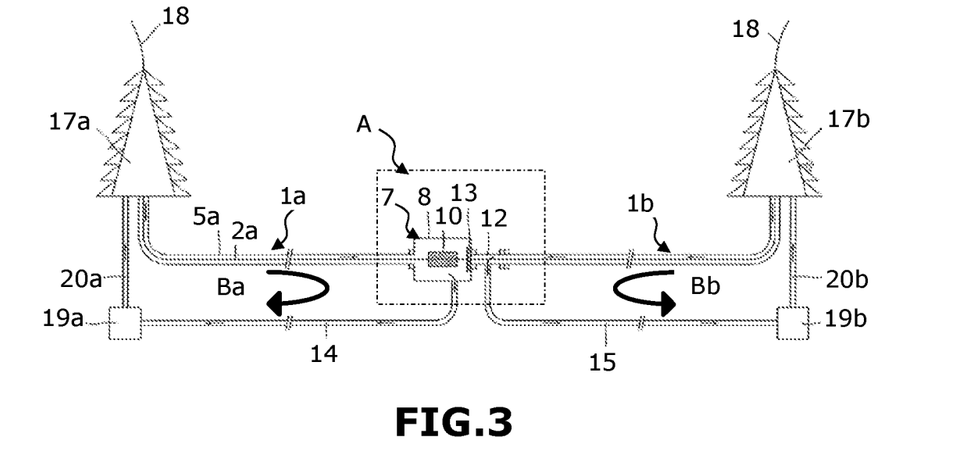
FIG. 3 depicts a first possible configuration for managing the cooling and pressure of cryogenic fluids for an example of a wired superconducting electric circuit.

FIG. 3 schematically illustrates a first possible configuration for managing the cooling and pressure of cryogenic fluids for an example of a wired superconducting electric circuit:

The wired electrical circuit uses the arrangement A described in connection with FIG. 1, and comprising the cryostatic junction unit 7 with its connector 10 for series-connecting the two length portions 1a, 1b of superconducting cable, its blocking device 13 and its outlet duct 14, the tap-off module 12 with its outlet tapping 15. Of course, the arrangement A' of FIG. 2 could equally be used in place of the arrangement A. The end of the first length portion 1a of superconducting cable opposite to the end that extends into the cryostatic junction unit of arrangement A is connected to a first termination 17a electrically connected to an electrical network 18. Likewise, the end of the second length portion 1b of superconducting cable that is the opposite end to the one that extends into the cryostatic junction unit of arrangement A is connected to a second termination 17b electrically connected also to the electrical network 18. The resulting electrical circuit constitutes, in one example, one phase of an electric power distribution network.

The circuit comprises a first cooling system 19a connected, on the one hand, to the first termination 17a via a first cryogenic transfer line 20a and, on the other hand, to the arrangement A via the inlet/outlet duct 14, to form a closed loop Ba for the circulation of a first cryogenic fluid. This cooling system 19a is configured to cool and pressurize the first cryogenic fluid circulating in the first length portion 1a of superconducting cable and received via the inlet/outlet duct 14 and reinject it into the first length portion 1a of superconducting cable via the first cryogenic transfer line 20a.

The circuit depicted further comprises a second cooling system 19b connected, on the one hand, to the second termination 17b via a second cryogenic transfer line 20b and, on the other hand, to the arrangement A via the inlet/outlet tapping 15 to form a closed loop Bb for the circulation of a second cryogenic fluid. This cooling system 19b is configured to cool and pressurize the second cryogenic fluid circulating in the second length portion 1b of superconducting cable and received via the inlet/outlet tapping 15 and reinject it into the second length portion 1b of superconducting cable via the second cryogenic transfer line 20b.

What has therefore been created here are two cryogenic fluid circulation closed loops Ba and Bb that are independent of one another. The two cryogenic fluids used for these loops Ba and Bb may be of the same nature or of different natures. In any event, the first cryogenic fluid which circulates at the outlet of the outlet duct 14 has a temperature that is higher and a pressure that is lower than those of this same fluid injected at the inlet of the first length portion 1a of cable at the termination 17a, but the cooling system 19a allows the temperature and pressure of this fluid to be readjusted for optimal operation of the length portion 1a of superconducting cable. Likewise, the second cryogenic fluid that circulates at the outlet of the outlet tapping 15 has a temperature that is higher and a pressure that is lower than those of this same fluid injected at the inlet of the length portion 1b of cable at the termination 17b, but the cooling system 19b allows the temperature and pressure of this fluid to be readjusted for optimal operation of the second length portion 1b of superconducting cable. The direction of circulation of the fluid in either one of the two circulation loops can be reversed.

Figure 4:
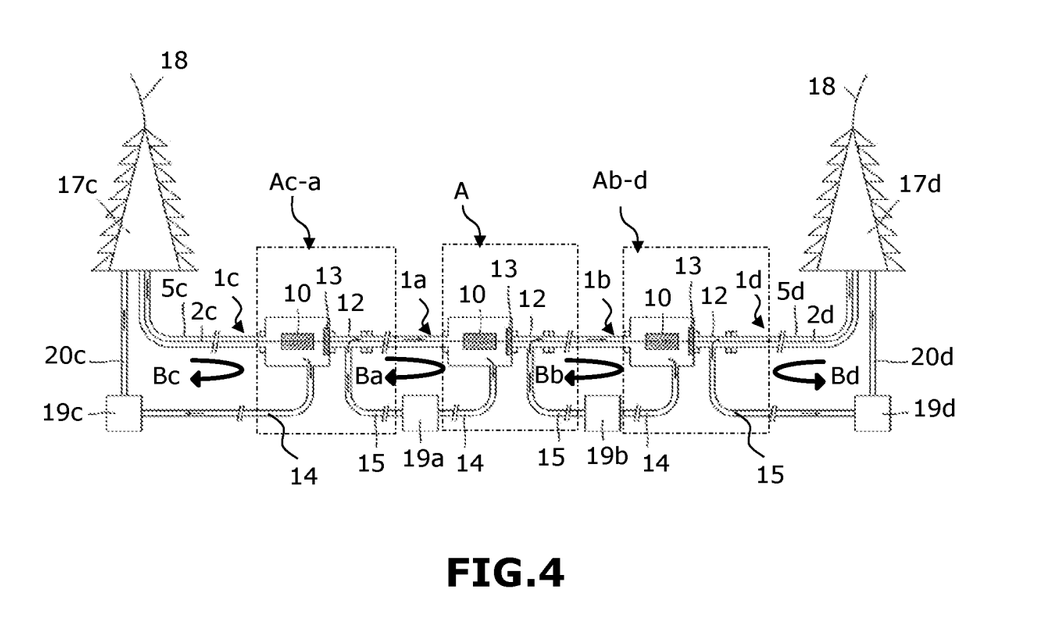
FIG. 4 depicts a second possible configuration for managing the cooling and pressure of cryogenic fluids for an example of a wired superconducting electric circuit.

FIG. 4 schematically illustrates a second possible configuration for managing the cooling and pressure of cryogenic fluids for an example of a wired superconducting electric circuit:

Here, the principle described with reference to FIG. 3 is extended to several length portions of superconducting cable, in this instance four length portions 1a, 1b, 1c and 1d of superconducting cable which are connected in series.

Once again, there is a first arrangement A like the one described in FIG. 3 for connecting a first length portion 1a of superconducting cable in series with a second length portion 1b of superconducting cable.

The circuit further comprises a third length portion 1c of superconducting cable, comprising, like the first portion 1a and the second portion 1b, a superconducting cable core 2c, an electrical insulation layer (not depicted) surrounding the superconducting cable core 2c, a screen (not depicted) surrounding the electrical insulation layer and a cryogenic jacket 5c surrounding the screen to allow the circulation of a cryogenic fluid in an annular space delimited by the screen and the cryogenic jacket 5c.

This third portion 1c is electrically connected in series with the first portion 1a of cable. To do that, the circuit comprises a second arrangement Ac-a similar to the first arrangement A. Thus, the second arrangement Ac-a comprises:
- its own cryostatic junction unit with its own connector 10 electrically connecting in series the third portion 1c and the end of the first portion 1a that is opposite to the end extending into the cryostatic junction unit 7 of the first arrangement A,
- its own inlet/outlet duct 14 for cryogenic fluid,
- its own tap-off module 12 comprising at least one inlet/outlet tapping 15 for the flow of at least one cryogenic fluid in the first length portion 1a of superconducting cable; and
- its own blocking device 13 for blocking the passage of cryogenic fluid and which is interposed between the inlet/outlet duct 14 of the second arrangement Ac-a and the inlet/outlet tapping 15 of the second arrangement Ac-a, the blocking device 13 here being positioned around and in contact with the screen of the first length portion 1a of superconducting cable.

The circuit comprises a first cooling system 19a connected, on the one hand, directly to the inlet/outlet duct 14 of the first arrangement A and, on the other hand, to the inlet/outlet tapping 15 of the second arrangement Ac-a to form a closed loop Ba for the circulation of a first cryogenic fluid. The first cooling system 19a is configured to cool and pressurize the first cryogenic fluid circulating in the first length portion 1a of superconducting cable and received via the inlet/outlet duct 14 of the first arrangement A and reinject it into the first length portion 1a of superconducting cable via the inlet/outlet tapping 15 of the second arrangement Ac-a.

The circuit further comprises a fourth length portion 1d of superconducting cable comprising, like the other portions 1a to 1c, a superconducting cable core 2d, an electrical insulation layer (not depicted) surrounding the superconducting cable core 2d, a screen (not depicted) surrounding the electrical insulation layer and a cryogenic jacket 5d surrounding the screen to allow the circulation of a cryogenic fluid in an annular space delimited by the screen and the cryogenic jacket 5d.

This fourth portion 1d is electrically connected in series with the second portion 1b of cable. To do that, the circuit comprises a third arrangement Ab-d similar to the first arrangement A and to the second arrangement Ac-a. Thus, the third arrangement Ab-d comprises:
- its own cryostatic junction unit with its own connector 10 electrically connecting in series the fourth portion 1d and the end of the second portion 1b that is opposite to the end extending into the cryostatic junction unit 7 of the first arrangement A,
- its own inlet/outlet duct 14 for cryogenic fluid,
- its own tap-off module 12 comprising at least one inlet/outlet tapping 15 for the flow of at least one cryogenic fluid in the fourth length portion 1d of superconducting cable; and
- its own blocking device 13 for blocking the passage of cryogenic fluid and which is interposed between the inlet/outlet duct 14 of the third arrangement Ab-d and the inlet/outlet tapping 15 of the third arrangement Ab-d, the blocking device 13 here being positioned around and in contact with the screen of the fourth length portion 1d of superconducting cable.

The circuit comprises a second cooling system 19b connected directly to the inlet/outlet duct 14 of the third arrangement Ab-d and to the inlet/outlet tapping 15 of the first arrangement A to form a closed loop Bb for the circulation of a second cryogenic fluid. The second cooling system 19b is configured to cool and pressurize the second cryogenic fluid circulating in the second length portion 1b of superconducting cable and received via the inlet/outlet duct 14 of the third arrangement Ab-d and reinject it into the second length portion 1b of superconducting cable via the inlet/outlet tapping 15 of the first arrangement A.

Moreover, the end of the third length portion 1c of superconducting cable opposite to the end extending into the cryostatic junction unit of the arrangement Ac-a is connected to a first termination 17c electrically connected to an electrical network 18. Likewise, the end of the fourth length portion 1d of superconducting cable opposite to the end extending into the cryostatic junction unit of the arrangement Ab-d is connected to a second termination 17d also electrically connected to the electrical network 18. The resulting electrical circuit constitutes for example one phase of an electrical power distribution network.

The circuit comprises a third cooling system 19c connected, on the one hand, to the first termination 17c via a first cryogenic transfer line 20c and, on the other hand, to the arrangement Ac-a via the inlet/outlet duct 14, to form a closed loop Bc for the circulation of a third cryogenic fluid. This cooling system 19c is configured to cool and pressurize the third cryogenic fluid circulating in the third length portion 1c of superconducting cable and received via the inlet/outlet duct 14 and to reinject it into the third length portion 1c of superconducting cable via the first cryogenic transfer line 20c.

The circuit depicted finally comprises a fourth cooling system $19d$ connected, on the one hand, to the second termination $17d$ via a second cryogenic transfer line $20d$ and, on the other hand, to the arrangement Ab-d via the inlet/outlet tapping 15 to form a closed loop Bd for the circulation of a fourth cryogenic fluid. This cooling system $19d$ is configured to cool and pressurize the fourth cryogenic fluid circulating in the fourth length portion $1d$ of superconducting cable and received via the inlet/outlet tapping 15 and reinject it into the fourth length portion $1d$ of superconducting cable via the second cryogenic transfer line $20d$.

What has therefore been created here are four mutually independent cryogenic fluid circulation closed loops Ba, Bb, Bc and Bd. Each closed loop manages, independently, the pressure and temperature of one of the length portions of cable. This in particular makes it possible to take into consideration the fact that the portions $1a$ to $1d$ may have different lengths.

In the example shown in FIG. 4, the direction of circulation of the fluid in any one of the four circulation loops Ba to Bd can be reversed. In addition, for each of the arrangements A, Ac-a and Ab-d, it is also possible to use the type A' arrangement of FIG. 2 in place of the type A arrangement of FIG. 1. Furthermore, although FIG. 4 shows four length portions of superconducting cable which are connected end to end by three arrangements of type A, the principle may be extended to N length portions of superconducting cable (where N is greater than 2) connected in series by means of (N−1) arrangements A or A'.

Figure 5:
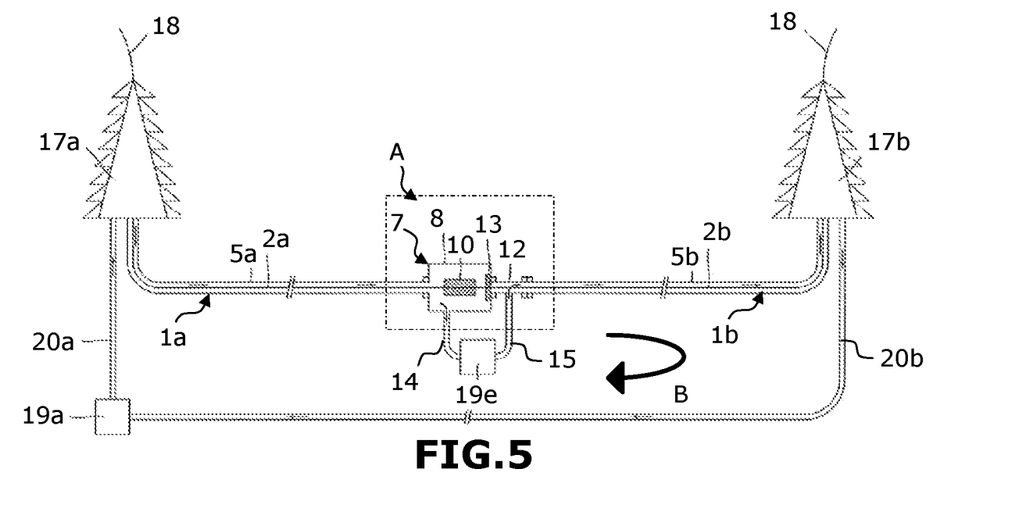
FIG. 5 depicts a third possible configuration for managing the cooling and pressure of cryogenic fluids for an example of a wired superconducting electric circuit.

FIG. 5 schematically illustrates a third possible configuration for managing the cooling and pressure of cryogenic fluids for an example of a wired superconducting electrical circuit:

Here, the question is not that of creating a circulation loop associated with each length portion of cable, but of effectively managing the pressure and temperature of a single cryogenic fluid circulating through all the length portions of cable joined in series.

The wired electrical circuit uses the arrangement A described in connection with FIG. 1 and comprising the cryostatic junction unit 7 with its connector 10 for the series connection of the two length portions $1a$, $1b$ of superconducting cable, its blocking device 13 and its inlet/outlet duct 14, and the tap-off module 12 with its inlet/outlet tapping 15. Of course, the arrangement A' of FIG. 2 could equally be used in place of the arrangement A. The two other ends of the length portions $1a$ and $1b$ of superconducting cable are each connected to a termination $17a$, $17b$ which is itself electrically connected to the electrical network 18. Here again, the resulting electrical circuit constitutes for example one phase of an electric power distribution network.

A cooling system $19e$ is connected directly to the inlet/outlet duct 14 and to the inlet/outlet tapping 15 of the arrangement A, this cooling system $19e$ being configured to cool and pressurize the cryogenic fluid circulating in the first length portion $1a$ of superconducting cable and received via the inlet/outlet duct 14 and reinject it into the second length portion $1b$ of superconducting cable via the inlet/outlet tapping 15.

The circuit of FIG. 5 finally comprises an additional cooling system $19a$ connected to the first termination $17a$ via a first cryogenic transfer line $20a$ and to the second termination $17b$ via a second cryogenic transfer line $20b$ to form a closed loop B for the circulation of the cryogenic fluid. The additional cooling system $19a$ is configured to cool and pressurize the cryogenic fluid circulating in the second length portion $1b$ of superconducting cable and received via the second cryogenic transfer line $20b$ and reinject it into the first length portion $1a$ of superconducting cable via the first cryogenic transfer line $20a$.

There is therefore just one loop B for the flow of cryogenic fluid in this third configuration (unlike the previous configurations which have two or more independent loops). Here again, the direction of circulation of the fluid can be reversed, the tapping 15 being used as the inlet and the duct 14 being used as the outlet. Furthermore, although FIG. 5 shows only two length portions of superconducting cable joined end to end by a type A arrangement, the principle may be extended to N length portions of superconducting cable (N being greater than 2) connected in series by means of (N−1) arrangements A or A'.

In the three preceding configurations described in connection with FIGS. 3 to 5, the wired assembly connected to the network 18 via the two terminations $17a$ and $17b$ and made up of the length portions of cables connected pairwise in series may correspond to one phase of a single-phase or three-phase system.

If the system is a three-phase system, then any one of the preceding configurations can be replicated for each of the three phases of the system.

Figure 6:
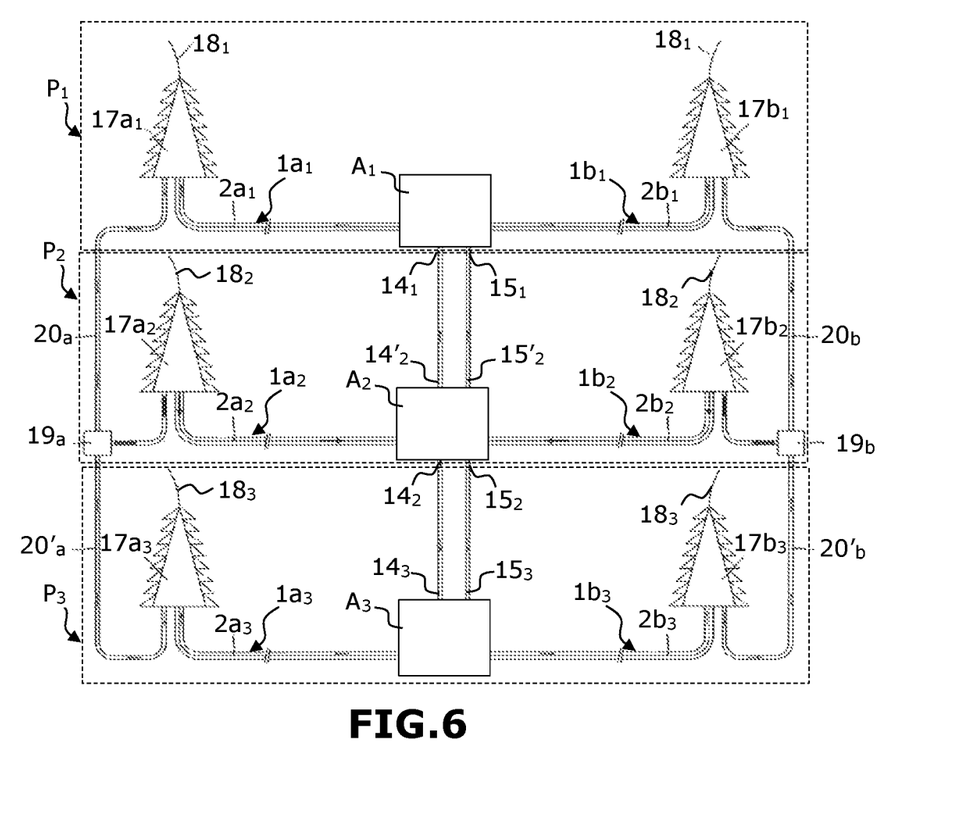
FIG. 6 depicts one possible configuration for managing the cooling and pressure of cryogenic fluids for an example of a three-phase electrical system.

Another possibility that is particularly well suited to the case of a three-phase system is described with reference to FIG. 6:

The system has three phases $P_1$, $P_2$ and $P_3$. Each phase $P_i$ (the integer i being equal to 1, 2 or 3) comprises:
- a first length portion $1a_i$ of superconducting cable and a second length portion $1b_i$ of superconducting cable, these being connected in series via an arrangement $A_i$;
- two terminations $17a_i$ and $17b_i$, to which are connected the ends of the first, and respectively second, length portion $1a_i$, $1b_i$ of superconducting cable that is the opposite end to the end extending into the cryostatic junction unit (not depicted) of the arrangement $A_i$, these two terminations $17a_i$ and $17b_i$ themselves being electrically connected to a phase $18_i$ of a three-phase electrical network.

The length portions $1a_i$, $1b_i$ of superconducting cable all have a superconducting cable core $2a_i$, $2b_i$, an electrical insulation layer (not depicted) surrounding the superconducting cable core $2a_i$, $2b_i$, a screen (not depicted) surrounding the electrical insulation layer and a cryogenic jacket surrounding the screen to allow the circulation of a cryogenic fluid in an annular space delimited by the screen and the cryogenic jacket. The arrangements $A_i$ are either of type A (described with reference to FIG. 1) or of type A' (described with reference to FIG. 2). To simplify the figure, each arrangement $A_i$ is thus depicted solely by its inlet/outlet duct $14_i$ and its inlet/outlet tapping $15_i$. Each arrangement therefore, according to the principle of the invention, comprises a cryostatic junction unit (not depicted) for the series electrical connection of the first portion $1a_i$ and the second portion $1b_i$, a tap-off module (not depicted), and a device for blocking the passage of cryogenic fluid (the device is not depicted) interposed between the inlet/outlet duct $14_i$ and the inlet/outlet tapping $15_i$, the blocking device being positioned around and in contact with the screen of the second length portion $1b_i$ of superconducting cable.

The two arrangements $A_1$ and $A_3$ are identical here insofar as they comprise a single inlet/outlet duct $14_1$ and $14_3$ respectively, and a single inlet/outlet tapping $15_1$ and $15_3$ respectively. The arrangement $A_2$ associated with the central phase, in this instance the phase $P_2$, further comprises an additional inlet/outlet duct $14'_2$ and an additional inlet/outlet tapping $15'_2$. As visible in FIG. 6, the duct $14_2$ and the tapping $15_2$ of the arrangement $A_2$ are respectively connected to the duct $14_3$ and to the tapping $15_3$ of the arrangement $A_3$ associated with the phase $P_3$, whereas the additional duct $14'_2$ and the additional tapping $15'_2$ of the arrangement $A_2$ are respectively connected to the duct $14_1$ and to the tapping $15_1$ of the arrangement $A_1$ associated with the phase $P_1$.

A first main flow of cryogenic fluid is injected via a first cooling system $19a$ preferably into the portion $1a_2$ of the central phase $P_2$ through the corresponding termination $17a_2$. Thanks to the presence of the duct $14_2$ and of the additional duct $14'_2$ of the cryostatic junction unit and of the blocking device of the arrangement $A_2$, this first flow is split into two. Each half-flow is respectively directed towards the cryostatic junction unit of the arrangement $A_1$, and respectively $A_3$, via their respective duct $14_1$, $14_3$. Thanks to the flow-blocking device installed in each arrangement $A_1$, $A_3$, each of these two half-flows then heads along the first portions $1a_1$ and $1a_3$ respectively towards the respective associated terminations $17a_1$, $17a_3$. Next, each half-flow returns to the first cooling system $19a$ through a corresponding transfer line $20a$, $20'a$. The half-flows are recombined to be reinjected once again via the termination $17a_2$, after the pressure and temperature have been readjusted.

A similar circulation applies on the other side of the system with a second main flow of cryogenic fluid injected via a second cooling system $19b$ into the portion $1b_2$ of the central phase $P_2$ through the corresponding termination $17b_2$. Thanks to the presence of the tapping $15_2$ and of the additional tapping $15'_2$ of the tap-off module, and of the blocking device of the arrangement $A_2$, this second main flow is split into two. Each half-flow is respectively directed towards the tap-off module of the respective arrangement $A_1$, $A_3$, by means of their respective tappings $15_1$, $15_3$. Thanks to the flow blocking device installed in each arrangement $A_1$, $A_3$, each of these two half-flows then heads along the second portions $1b_1$ and respectively $1b_3$ towards the respective associated terminations $17b_1$, $17b_3$. Next, each half-flow returns to the second cooling system $19b$ through a corresponding transfer line $20b$, $20'b$. The half-flows are recombined to be reinjected once again via the termination $17b_2$, once the pressure and temperature have been readjusted.

The invention claimed is:

1. A superconducting wired electric circuit, comprising:
    a first length portion of superconducting cable and a second length portion of superconducting cable, each of the first and second length portions of superconducting cable comprising a superconducting cable core, an electrical insulation layer surrounding the superconducting cable core, a shielding screen surrounding the electrical insulation layer and a cryogenic jacket surrounding the screen to allow a cryogenic fluid to circulate in an annular space delimited by the screen and the cryogenic jacket; and
    at least a first arrangement comprising a cryostatic junction unit electrically connecting, in series, the first portion and the second portion, an inlet/outlet duct for cryogenic fluid, and a device for blocking the passage of cryogenic fluid positioned around and in contact with the shielding screen of the second length portion of superconducting cable,
    wherein said at least one first arrangement further comprises a tap-off module distinct from both said cryostatic junction unit and the second length portion, and interposed between the cryostatic junction unit and the second length portion of superconducting cable, said tap-off module comprising at least one inlet/outlet tapping for the flow of a cryogenic fluid in the second length portion of superconducting cable; and in that the device for blocking the passage of cryogenic fluid is interposed between said inlet/outlet duct and said inlet/outlet tapping;
    wherein the tap-off module having, passing through it without discontinuity, an end of the second portion of cable comprising the core, the insulation layer and the screen so that the end of the second portion of cable comprising the core, the insulation layer and the screen can enter the cryostatic junction unit; the tap-off module also comprising a cryogenic jacket to ensure the continuity of the flow of cryogenic fluid;
    wherein said at least one inlet/outlet tapping being mounted on the cryogenic jacket.

2. The superconducting wired electric circuit according to claim 1, wherein said cryostatic junction unit comprises:
    two access openings through each of which an end of the first, and respectively of the second, length portion of superconducting cable may extend, each opening being configured to allow the fluid-tight fixing of an end of the cryogenic jacket of the corresponding length portion of superconducting cable, and
    a connector electrically connecting the ends of the two superconducting cable cores.

3. The superconducting wired electric circuit according to claim 2, wherein the locking device of said arrangement is positioned inside the cryostatic junction unit, facing the access opening through which the second length portion of cable passes and against this access opening so as to block it off, said cryostatic junction unit further bearing said cryogenic fluid inlet/outlet duct.

4. The superconducting wired electric circuit according to claim 2, wherein the tap-off module bears said inlet/outlet duct of said arrangement, and the blocking device is positioned inside the tap-off module, between said inlet/outlet duct and said inlet/outlet tapping.

5. The superconducting wired electric circuit according to claim 1, comprising at least one cooling system connected to the inlet/outlet duct and/or to the inlet/outlet tapping so as to receive a cryogenic fluid circulating inside one of the portions of cable.

6. The superconducting wired electric circuit according to claim 5, wherein the end of the first, and respectively of the second, length portion of superconducting cable, opposite to the end extending into the cryostatic junction unit of the first arrangement is connected to a first, and respectively to a second, termination electrically connected to an electrical network,
    said at least one cooling system being connected to the first termination via a first cryogenic transfer line and to said first arrangement via the inlet/outlet duct so as to form a closed loop for the circulation of a first cryogenic fluid, said at least one cooling system being configured to cool and pressurize the first cryogenic fluid circulating in the first length portion of superconducting cable and received via the inlet/outlet duct and to reinject it into the first length portion of superconducting cable via the first cryogenic transfer line.

7. The superconducting wired electric circuit according to claim 6, comprising an additional cooling system connected to the second termination via a second cryogenic transfer line and to said first arrangement via the inlet/outlet tapping to form a closed loop for the circulation of a second cryogenic fluid, said additional cooling system being configured to cool and pressurize the second cryogenic fluid circulating in the second length portion of superconducting cable and received via the inlet/outlet tapping and to reinject it into the second length portion of superconducting cable via the second cryogenic transfer line.

8. The superconducting wired electric circuit according to claim 5, wherein the cooling system is connected directly to the inlet/outlet duct and to the inlet/outlet tapping of said first arrangement, said cooling system being configured to cool and pressurize the cryogenic fluid circulating in the first length portion of superconducting cable and received via the inlet/outlet duct and to reinject it into the second length portion of superconducting cable via the inlet/outlet tapping.

9. The superconducting wired electric circuit according to claim 8, wherein the end of the first, and respectively of the second, length portion of superconducting cable, opposite to the end extending into the cryostatic junction unit of said first arrangement is connected to a first, and respectively to a second, termination electrically connected to an electrical network.

10. The superconducting wired electric circuit according to claim 9, comprising an additional cooling system connected to the first termination via a first cryogenic transfer line and to the second termination via a second cryogenic transfer line to form a closed loop for the circulation of the cryogenic fluid, said additional cooling system being configured to cool and pressurize the cryogenic fluid circulating in the second length portion of superconducting cable and received via the second cryogenic transfer line and to reinject it into the first length portion of superconducting cable via the first cryogenic transfer line.

11. The superconducting wired electric circuit according to claim 5, comprising:
   a third length portion of superconducting cable comprising a superconducting cable core, an electrical insulation layer surrounding the superconducting cable core, a screen surrounding the electrical insulation layer and a cryogenic jacket surrounding the screen to allow the circulation of a cryogenic fluid in an annular space delimited by the screen and the cryogenic jacket; and
   a second arrangement comprising a cryostatic junction unit electrically connecting, in series, the third portion and the end of the first portion opposite to the end extending into the cryostatic junction unit of the first arrangement, an inlet/outlet duct for cryogenic fluid, a tap-off module comprising at least one inlet/outlet tapping for the flow of at least a cryogenic fluid in the first length portion of superconducting cable, and a device for blocking the passage of cryogenic fluid and interposed between said inlet/outlet duct of the second arrangement and said inlet/outlet tapping of the second arrangement, the blocking device being positioned around and in contact with the screen of the first length portion of superconducting cable,
   wherein the cooling system is connected directly to the inlet/outlet duct of the first arrangement and to the inlet/outlet tapping of the second arrangement to form a closed loop for the circulation of a first cryogenic fluid, said cooling system being configured to cool and pressurize the first cryogenic fluid circulating in the first length portion of superconducting cable and received via the inlet/outlet duct of the first arrangement (A) and to reinject it into the first length portion of superconducting cable via the inlet/outlet tapping of the second arrangement.

12. The superconducting wired electric circuit according to claim 11, comprising:
   a fourth length portion of superconducting cable comprising a superconducting cable core, an electrical insulation layer surrounding the superconducting cable core, a screen surrounding the electrical insulation layer and a cryogenic jacket surrounding the screen to allow the circulation of a cryogenic fluid in an annular space delimited by the screen and the cryogenic jacket;
   a third arrangement comprising a cryostatic junction unit electrically connecting, in series, the fourth portion and the end of the second portion opposite to the end extending into the cryostatic junction unit of the first arrangement, an inlet/outlet duct for cryogenic fluid, a tap-off module comprising at least one inlet/outlet tapping for the flow of at least a cryogenic fluid in the fourth length portion of superconducting cable, and a device for blocking the passage of cryogenic fluid and interposed between said inlet/outlet duct of the third arrangement and said inlet/outlet tapping of the third arrangement, the blocking device being positioned around and in contact with the screen of the fourth length portion of superconducting cable, and
   an additional cooling system connected directly to the inlet/outlet duct of the third arrangement and to the inlet/outlet tapping of the first arrangement to form a closed loop for the circulation of a second cryogenic fluid, said additional cooling system being configured to cool and pressurize the second cryogenic fluid circulating in the second length portion of superconducting cable and received via the inlet/outlet duct of the third arrangement and to reinject it into the second length portion of superconducting cable via the inlet/outlet tapping of the first arrangement.

13. The superconducting wired electric circuit according to claim 1, wherein the end of the first, and respectively of the second, length portion of superconducting cable, opposite to the end extending into the cryostatic junction unit of the first arrangement is connected to a first, and respectively to a second, termination electrically connected to a phase of an electrical network.

14. A three-phase system comprising three superconducting wired electrical circuits according to claim 13, each defining one phase of the system.

15. The three-phase system according to claim 14, wherein the first arrangement of a first phase of the three phases of the system comprises an additional inlet/outlet duct and an additional inlet/outlet tapping and is connected to the first arrangements of each of the other two phases such that:
   its inlet/outlet duct and its inlet/outlet tapping are respectively connected to the inlet/outlet duct and to the tapping of the first arrangement associated with a second phase of the three phases;
   its additional inlet/outlet duct and its additional inlet/outlet tapping are respectively connected to the inlet/outlet duct and to the inlet/outlet tapping of the first arrangement associated with a third phase of the three phases.

16. The three-phase system according to claim 15, further comprising:
   a first cooling system injecting a first main flow of cryogenic fluid into the first length portion of cable of the first phase through the corresponding termination;
   a second cooling system injecting a second main flow of cryogenic fluid into the second length portion of cable of the first phase through the corresponding termination, wherein the first, and respectively the second, main flow is divided by the first arrangement of the first phase into two half-flows and then recombined by the first, and respectively by the second, cooling system to be reinjected once again, after the pressure and temperature have been readjusted, into the first, and respectively into the second, length portion of cable of the first phase.

* * * * *